No. 624,517.  Patented May 9, 1899.
A. C. MERCER.
PHOTOGRAPHIC FINDER.
(Application filed Mar. 2, 1899.)

(No Model.)

Witnesses:  Inventor:
Alfred Clifford Mercer
by Macleod Calver & Randall
his Attorneys

THE NORRIS PETERS CO., PHOTO-LITHO., WASHINGTON, D. C.

UNITED STATES PATENT OFFICE.

ALFRED CLIFFORD MERCER, OF SYRACUSE, NEW YORK.

PHOTOGRAPHIC FINDER.

SPECIFICATION forming part of Letters Patent No. 624,517, dated May 9, 1899.

Application filed March 2, 1899. Serial No. 707,428. (No model.)

*To all whom it may concern:*

Be it known that I, ALFRED CLIFFORD MERCER, a citizen of the United States, residing at Syracuse, in the county of Onondaga and State of New York, have invented certain new and useful Improvements in Finders for Photographic Cameras, of which the following is a specification, reference being had therein to the accompanying drawings.

The object of my invention is to produce an improved finder which while it is susceptible of being embodied in a most perfect optical construction is equally susceptible of being embodied in a comparatively very inexpensive form having sufficiently satisfactory optical properties. At the present time the use of inexpensive hand-cameras is very large, and as it is considered essential that every camera should be fitted with at least one finder, and preferably with two, the fact is apparent that a very important element of the question whether a finder can command an extensive sale on the market is whether it can be cheaply made. However, while low cost is an important requisite a finder should produce an image that will be brilliant, clear, accurate, upright, and not reversed from right to left. It should enable the camera to which it is attached to be held for use in a convenient position in front of the chest or abdomen and the image to be viewed when the eyes are directed downward toward the camera. Finally, the finder as a whole must be extremely compact in order that the mounting in which it is supported may take up the least possible space either inside or outside a camera-box.

I have devised a novel form of finder in which the highest degree of compactness is obtained in conjunction with the other qualities enumerated above.

My device is presented in the accompanying drawings, explained in the following description, and defined in the claims at the close of this specification.

Figure 1:
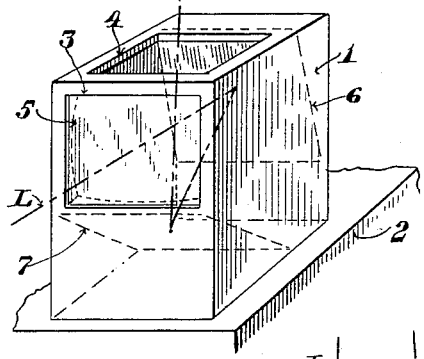
Figure 2:
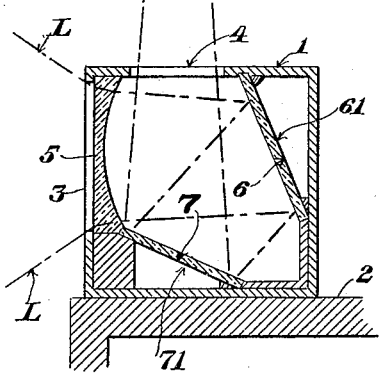
Figure 3:
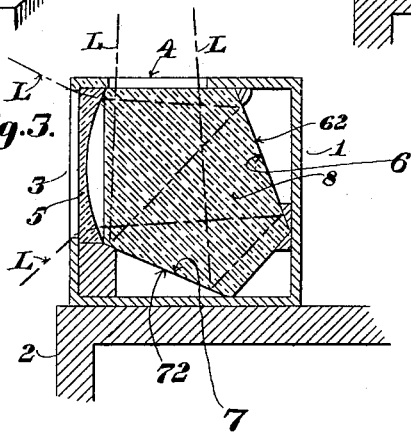

In the drawings, Figure 1 is a perspective view of my finder attached to a camera. Fig. 2 is a middle vertical longitudinal section of the finder, showing its reflecting-surfaces as consisting of mirrors. Fig. 3 is a similar view showing the substitution of a prism for mirrors.

In practice I inclose the optical portions of my finder in a casing or mounting 1, which is designed to rest upon or be attached to a camera-box 2, although the said mounting may be inclosed within the camera-box, if desired. The mounting has an opening 3 in the front thereof and another opening 4 in the top thereof, the former opening admitting the rays of light L L from the object or view, while the latter permits of their passage out of the finder to the eyes of the user, located at E. In the front opening 3 is fixed a negative lens 5. This lens may of course be either single or multiple, here being shown as single. Opposite the front opening 3 is fixed a reflecting-surface 6, which may be either the silvered surface of a mirror, as at 61, Fig. 2, or the surface 62 of a prism 8, Fig. 3. The said surface 6 is inclined downward, so as to reflect the light that is received by it from the negative lens 5 downward upon a second reflecting-surface 7, from which the light is reflected upward to the eyes of the user through the top opening 4. The greatest economy of space and compactness are attained by disposing the surface 6 to reflect the light forwardly and locating the second reflecting-surface 7 in advance of the reflecting-surface 6 and in the bottom of the mounting beneath the top opening 4, so that the light reflected from the said second reflecting-surface 7 shall pass almost directly upward. The surface 7 may be constituted by a mirror, as at 71, Fig. 2, or by a surface 72 of the prism 8, Fig. 3.

It will be understood that the arrangement of reflecting-surfaces which is illustrated in the drawings possesses the qualities of producing an erect image and of reflecting the light that enters the finder from the object or view, so that the said light shall issue vertically or nearly vertically from the finder and shall reach the eyes of the user of the camera when they are conveniently situated above with respect to the camera, and I am unacquainted with any other two-mirror finder that produces this result or which obtains the size of image which I obtain without sacrificing compactness to the extent of requiring a mounting larger than mine.

My invention enables the use of smaller mirrors and mounting in proportion to the breadth of the light-path than in any other finder embodying two mirrors and a negative lens in combination.

The general function of the negative lens 5 is to refract the converging rays of light, as L L, that pass from the object or view through the front opening of the finder, so as to cause their point of convergence to recede upward and permit the eyes of the user to be held a foot or more from the finder, or, in other words, so that while the eyes are held a foot or more from the aperture 4, and that aperture therefore subtends a smaller visual angle, the limits of the view subtend a much larger angle as they enter the finder, so much larger, in fact, that there is no difficulty in making them correspond with the angle of whatever camera-lens may be used. Thereby the user is enabled to use the finder without assuming an awkward and constrained position, such as would become necessary if his eyes had to be placed in closer proximity to the top opening of the finder. Indeed, in the absence of a negative lens the eyes of the user would have to be actually within the mounting of the finder in order to see the whole object or view. My arrangement of reflecting-surfaces, however, peculiarly coöperates with the negative lens and enables a much smaller lens than is required in less compact two-mirror finders to produce an equally large image.

What I claim is—

1. In a finder for photographic cameras, a mounting having a front opening for the admission of light from the object or view and an opening for the emission thereof to the eyes of the user of the finder, a downwardly-inclined reflecting-surface located back of the said front opening reflecting the light downward and a second reflecting-surface located below the first and receiving the downwardly-reflected light therefrom and reflecting it upward through the emitting-opening of the mounting, substantially as described.

2. In a finder for photographic cameras, a mounting having a front opening for the admission of light from the object or view and an opening for the emission thereof to the eyes of the user of the finder, a negative lens supported in the said front opening, a downwardly-inclined reflecting-surface located back of the said front opening reflecting the light downward, and a second reflecting-surface located below the first and receiving the downwardly-reflected light therefrom and reflecting it upward through the emitting-opening of the mounting, substantially as described.

3. In a finder for photographic cameras, a mounting having a front opening for the admission of light from the object or view and an opening for the emission thereof to the eyes of the user of the finder, a downwardly-inclined reflecting-surface located back of the said front opening reflecting the light downward and forward in a direction toward the object or view, and a second reflecting-surface located below the first and receiving the downwardly-reflected light therefrom and reflecting it upward through the emitting-opening of the mounting, substantially as described.

4. In a finder for photographic cameras, a mounting having a front opening for the admission of light from the object or view and an opening for the emission thereof to the eyes of the user of the finder, and a prism located between the two openings of the finder and having a downwardly-inclined reflecting-surface located back of the said front opening reflecting the light downward, and a second reflecting-surface located below the first and receiving the downwardly-reflected light therefrom and reflecting it upward through the emitting-opening of the mounting, substantially as described.

5. In a finder for photographic cameras, a mounting having a front opening for the admission of light from the object or view and an opening for the emission thereof to the eyes of the user of the finder, and a prism located between the two openings of the finder and having a downwardly-inclined reflecting-surface located back of the said front opening reflecting the light downward and forward in a direction toward the object or view, and a second reflecting-surface located below the first and receiving the downwardly-reflected light therefrom and reflecting it upward through the emitting-opening of the mounting, substantially as described.

6. In a finder for photographic cameras, a mounting having a front opening for the admission of light from the object or view and an opening for the emission thereof to the eyes of the user of the finder, a negative lens supported in the said front opening, a downwardly-inclined reflecting-surface located back of the said front opening reflecting the light downward and forward in a direction toward the object or view, and a second reflecting-surface located below the first and receiving the downwardly-reflected light therefrom and reflecting it upward through the emitting-opening of the mounting, substantially as described.

7. In a finder for photographic cameras, a mounting having a front opening for the admission of light from the object or view and an opening for the emission thereof to the eyes of the user of the finder, a negative lens supported in the said front opening, and a prism located between the two openings of the finder and having a downwardly-inclined reflecting-surface located back of the said front opening reflecting the light downward, and a second reflecting-surface located below the first and receiving the downwardly-reflected light therefrom and reflecting it upward through the emitting-opening of the mounting, substantially as described.

8. In a finder for photographic cameras, a mounting having a front opening for the admission of light from the object or view and an opening for the emission thereof to the eyes of the user of the finder, a negative lens supported in the said front opening, and a prism located between the two openings of the finder and having a downwardly-inclined reflecting-surface located back of the said front opening reflecting the light downward and forward in a direction toward the object or view, and a second reflecting-surface located below the first and receiving the downwardly-reflected light therefrom and reflecting it upward through the emitting-opening of the mounting, substantially as described.

In testimony whereof I affix my signature in presence of two witnesses.

A. CLIFFORD MERCER.

Witnesses:
 EDWARD W. BURDICK,
 FRANK P. RUTHERFORD.